No. 781,779. PATENTED FEB. 7, 1905.
N. LOMBARD.
GOVERNOR.
APPLICATION FILED MAY 12, 1904.

7 SHEETS—SHEET 1.

Witnesses:
Edwin T Luce
Edna C Cleveland

Inventor:
Nathaniel Lombard,
by Walter E. Lombard,
Atty.

No. 781,779. PATENTED FEB. 7, 1905.
N. LOMBARD.
GOVERNOR.
APPLICATION FILED MAY 12, 1904.

7 SHEETS—SHEET 5.

Witnesses:
Edwin T Luce
Edna C Cleveland

Inventor:
Nathaniel Lombard,
by Walter E Lombard,
Atty.

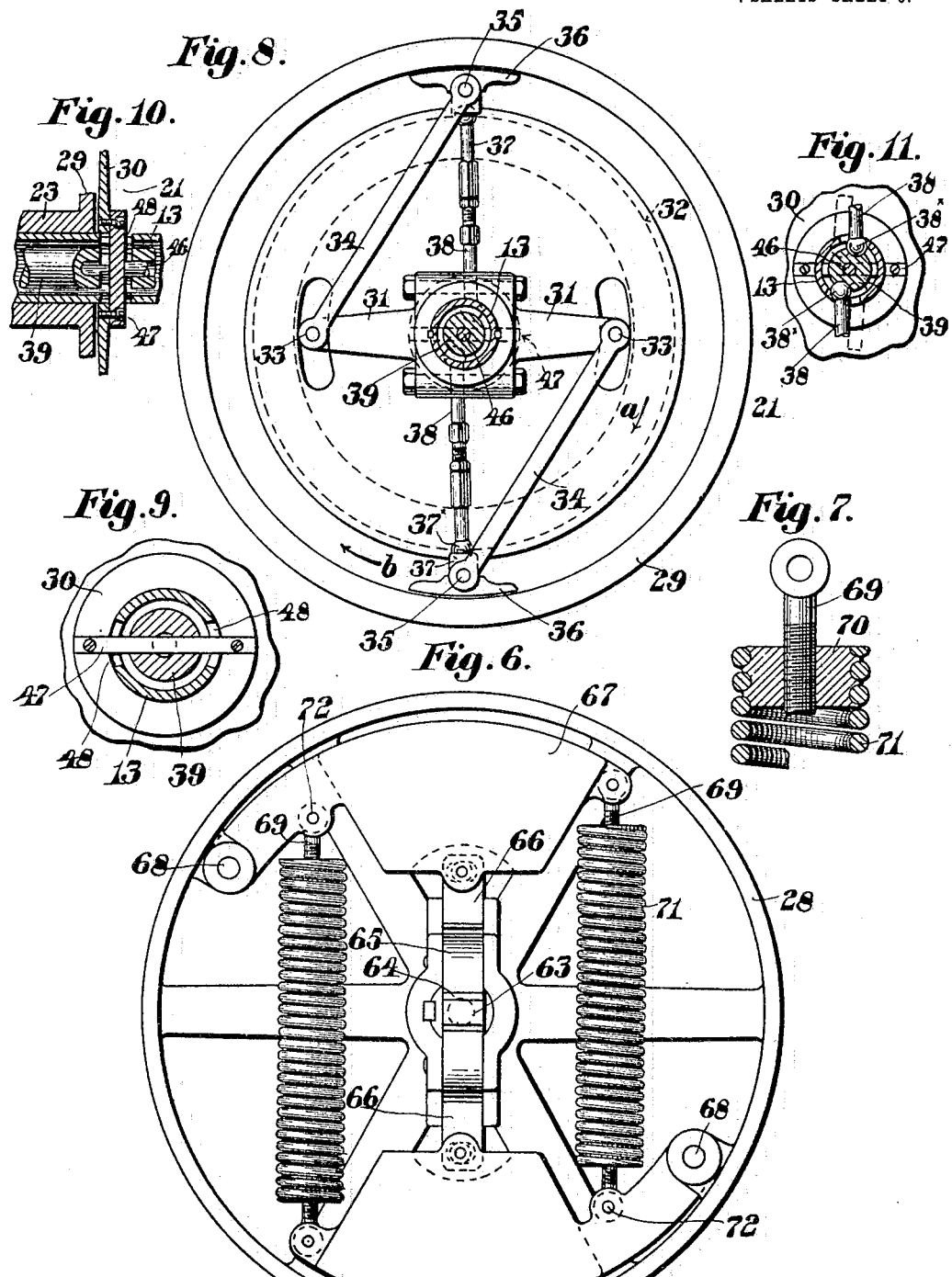

No. 781,779. PATENTED FEB. 7, 1905.
N. LOMBARD.
GOVERNOR.
APPLICATION FILED MAY 12, 1904.
7 SHEETS—SHEET 7.
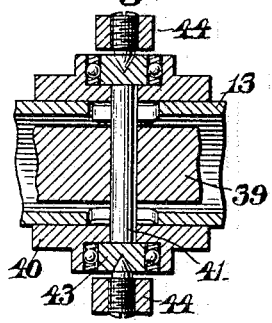
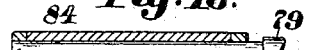
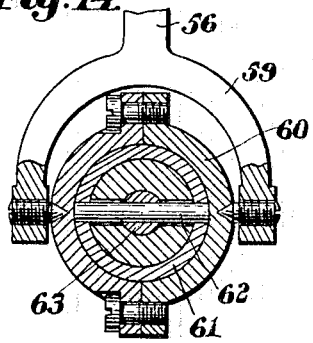
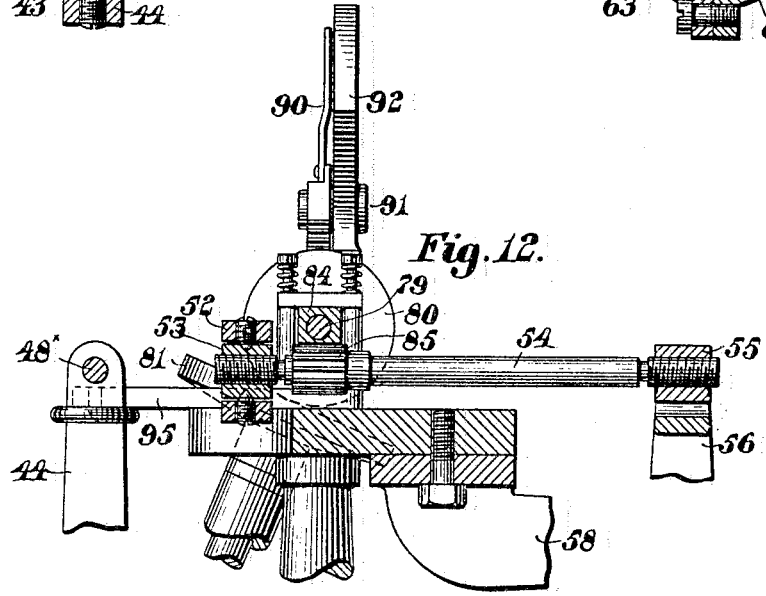
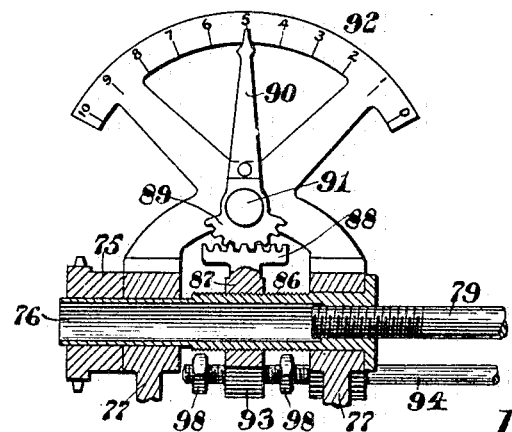
Witnesses:
Edwin T Luce
Edna C Cleveland
Inventor:
Nathaniel Lombard,
by Walter E Lombard,
Atty.

No. 781,779.                                              Patented February 7, 1905.

UNITED STATES PATENT OFFICE.

NATHANIEL LOMBARD, OF WORCESTER, MASSACHUSETTS, ASSIGNOR TO THE IMPROVED GOVERNOR COMPANY, OF WATERVILLE, MAINE, A CORPORATION OF MAINE.

GOVERNOR.

SPECIFICATION forming part of Letters Patent No. 781,779, dated February 7, 1905.

Application filed May 12, 1904. Serial No. 207,532.

*To all whom it may concern:*

Be it known that I, NATHANIEL LOMBARD, a citizen of the United States of America, and a resident of Worcester, in the county of Worcester and State of Massachusetts, have invented certain new and useful Improvements in Governors, of which the following is a specification.

This invention relates to mechanism for controlling the speed of various motors, and more particularly to such governors which serve to apply power from an auxiliary source to effect the movements of the valve, gate, or other regulating device.

It consists in certain novel features of construction and arrangement of parts, which will be readily understood by reference to the description of the drawings and to the claims to be hereinafter given.

Figure 1:
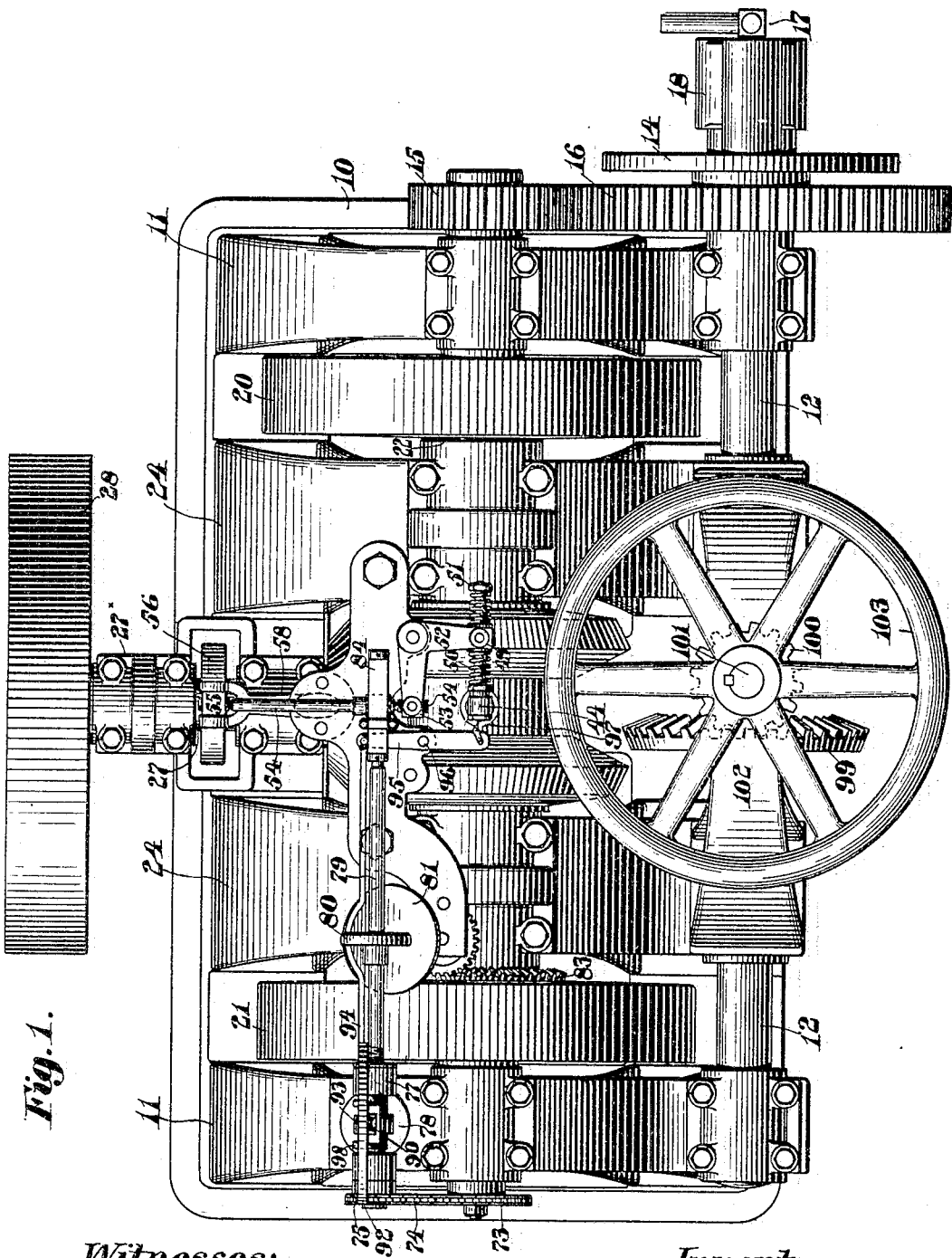
Figure 2:
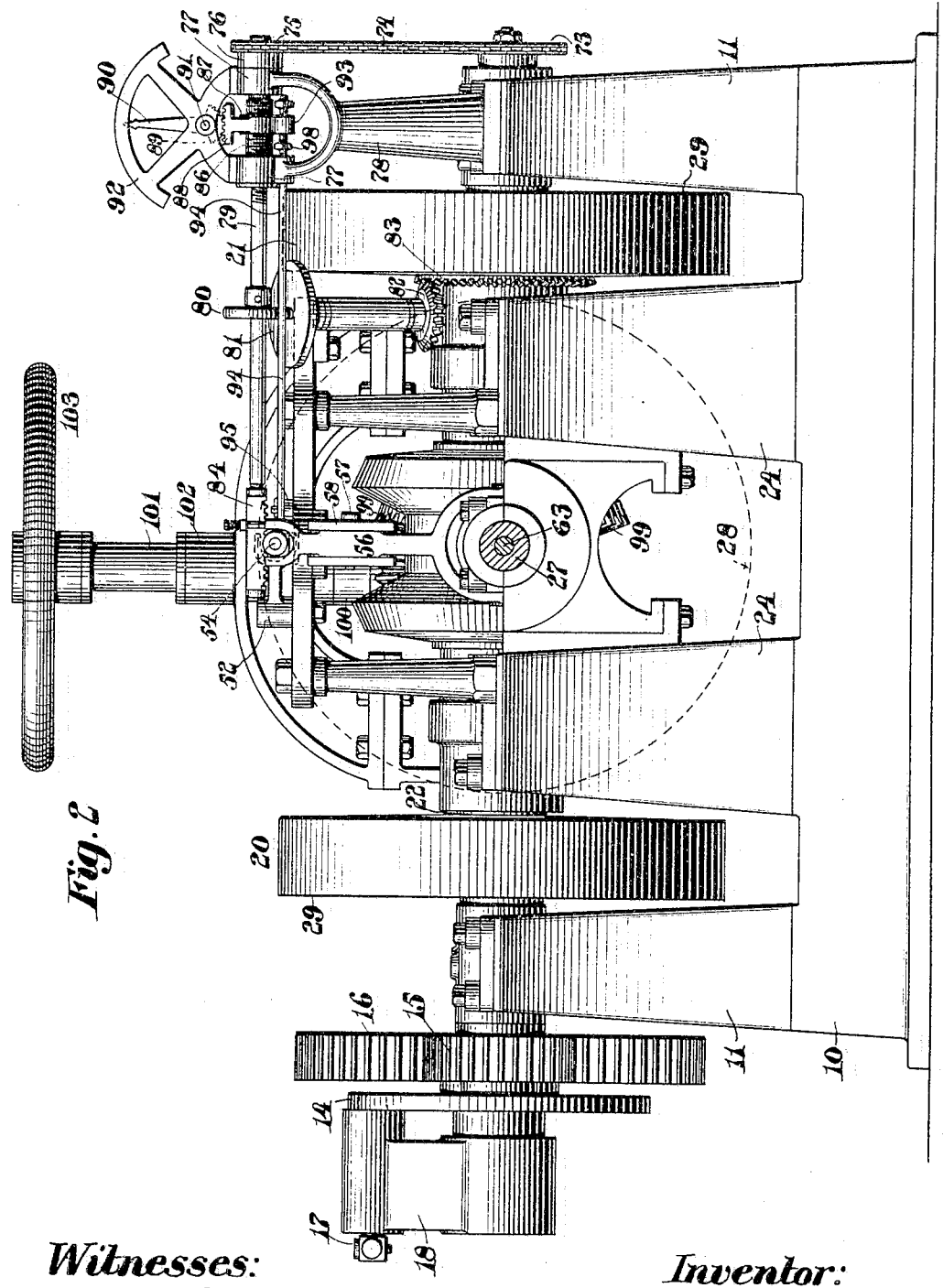
Figure 3:
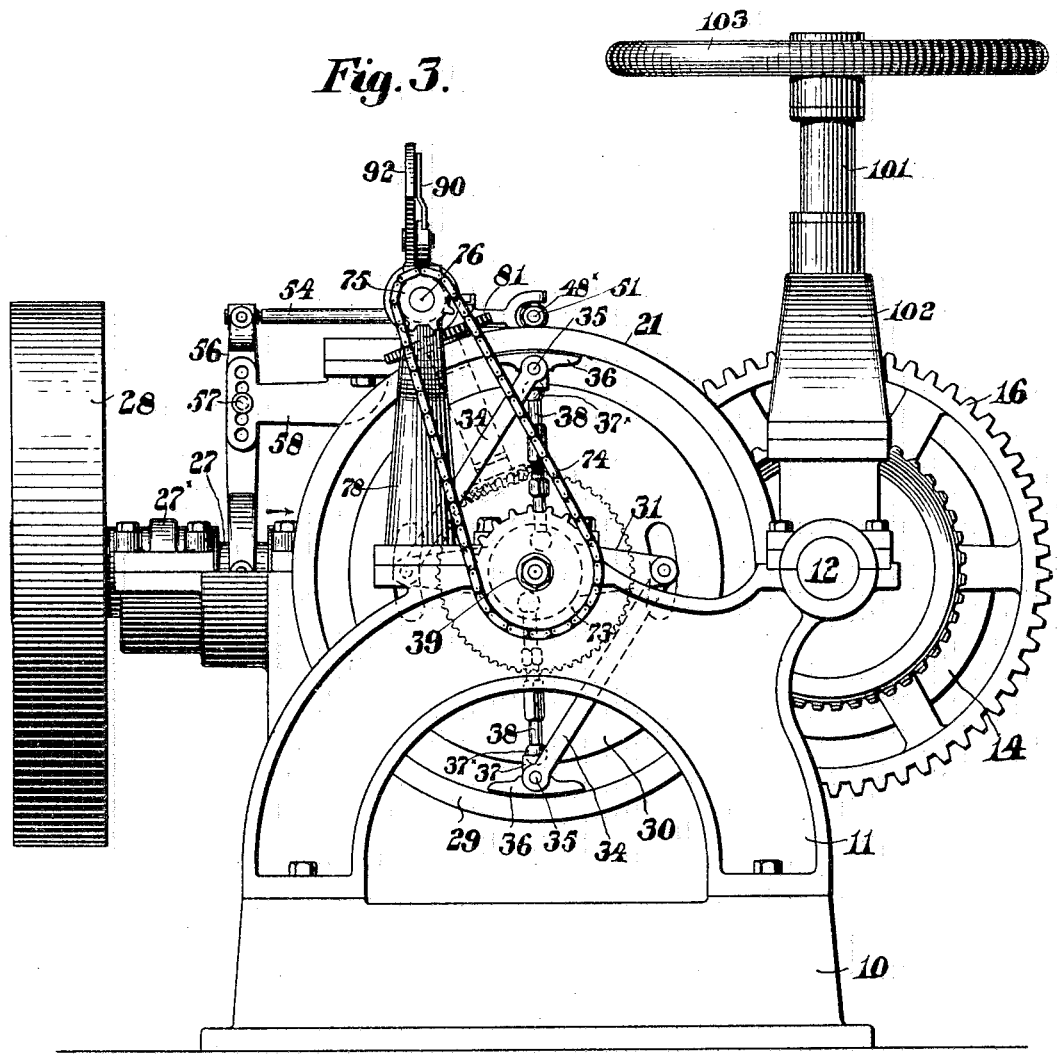
Figure 4:
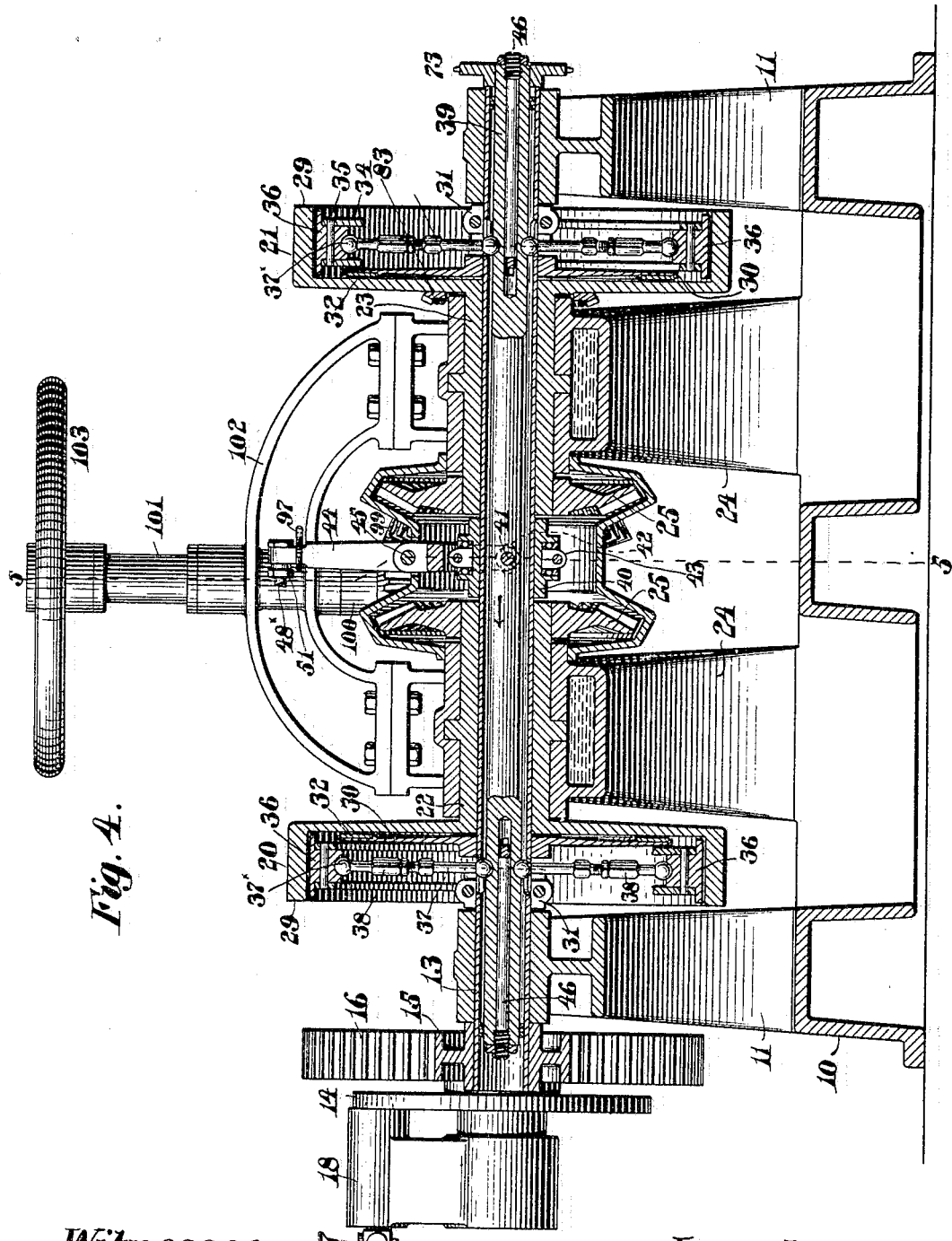
Figure 5:
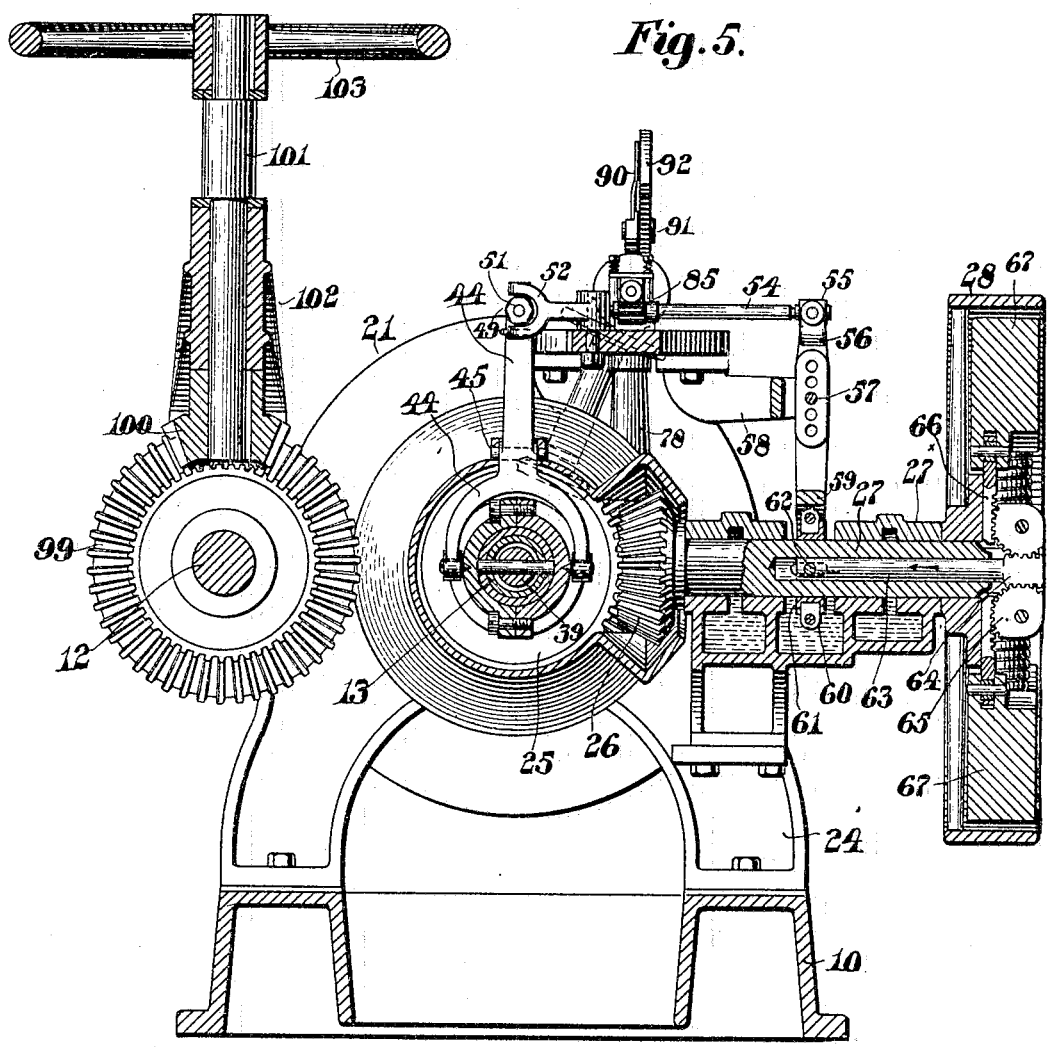

Of the drawings, Figure 1 represents a plan view of a governer embodying the features of this invention. Fig. 2 represents a rear elevation of the same, a portion of the driving mechanism being shown removed therefrom. Fig. 3 represents a left-hand end elevation of the same. Fig. 4 represents a longitudinal central vertical section looking toward the front of the machine. Fig. 5 represents a sectional elevation of the same, the cutting plane being on line 5 5 on Fig. 4. Fig. 6 represents an end elevation of the driving-pulley and the controlling mechanism contained therein. Fig. 7 represents a detail of the spring tension device for controlling the centrifugal weights. Fig. 8 represents a face view of one of the clutch mechanisms. Figs. 9 and 10 represent sectional details showing the key for securing the actuating-shaft to its clutch member and its connection with the operating member. Fig. 11 represents a section of the operating member, showing the relative positions of the recesses for the toggle members of the two pairs of clutches. Fig. 12 represents a sectional elevation of the devices for connecting the primary driver and the operating-member lever. Fig. 13 represents a sectional elevation of the revoluble sleeve and indicator mechanism. Fig. 14 represents a sectional detail of the primary driving-shaft and its slidable coöperating member. Fig. 15 represents a sectional detail of the operating member actuating-collars, and Fig. 16 represents a sectional detail of the controlling-rod rack and its coöperating gear. Figs. 6, 8, 10, and 11 are drawn to a larger scale, and Figs. 7, 9, 12 to 16, inclusive, are drawn to a still larger scale.

Similar characters designate like parts throughout the several figures of the drawings.

The numeral 10 designates a suitable baseplate, on which is journaled in standards 11 a shaft 12 for connection with the gate or regulating device for controlling the speed of a motor—as, for example, a turbine-wheel— which shaft may be appropriately termed a "motor-controlling" shaft. In the standards 11 may be also journaled a preferably hollow actuating-shaft 13 for the motor-controlling shaft, they being conveniently connected by spur-gears 15 and 16, the latter having secured thereto a disk 14, which is preferably releasably fixed to the shaft 12 by some such connector as a pin-clutch 17, carried by an arm 18, fast upon the shaft and engaging an opening in the disk 14.

The actuating-shaft 13 has keyed to it the inner members of clutches or connectors 20 21, the outer members of which are fixed to or formed integrally with driving-shafts 22 23, respectively, which are here shown as hollow, surrounding the actuating-shaft and journaled in the standards 24, supported from the baseplate between the standards 11.

The driving-shafts may be conveniently rotated in opposite directions by bevel-gears 25, meshing with a bevel-gear 26, fixed to a shaft 27, conveniently journaled in a bracket 27* on the standard 24 and rotated at the desired speed from any suitable source of power through a pulley 28. The outer member of each clutch may consist of a flanged disk 29, while the inner coacting member is preferably formed of a disk 30, provided with an annular frictional surface 32, adapted to coact with the inner face of the outer clutch member 29. The actuating-shaft 13 has also keyed thereto laterally-projecting arms 31, to the outer end of which are articulated at 33 connecting arms or supports 34, to the opposite end of which are pivoted at 35 the shoes 36, the bearing-surface of which coacts with the inner periphery of the flanged disk 29.

The shoes 36 are provided with a boss 37, the outer end of which is provided with a recess or socket to receive the ball end 37* of the adjustable toggle member 38, the opposite end of which is provided with a ball end 38*, which enters a recess or socket formed in the operating rod or member 39. In the normal positions the adjustable toggle member 38 is slightly out of radial line with the axis of the operating-rod 39, with the shoes 36 slightly removed from contact with the inner periphery of the flanged member 29. When, however, the clutch members 29 and 30 are coöperating to rotate the actuating-shaft 13, with its radial arms 31, in the direction of the arrow $a$ on Fig. 8, the arms 34 will move the shoes 36 in the direction indicated by the arrow $b$ on Fig. 8, which movement will cause the toggle member 38 to be moved into a position radial to the axis of said operating member 39, thereby causing the latter to be revolved about its axis in unison with the driving clutch members 29 and 30.

Intermediate the gears 25 a grooved collar 40 is mounted upon the actuating-shaft 13, and a pin 41 extends diametrically from side to side of said collar, said pin extending through a slot 42 in the actuating-shaft and through the operating-rod 39, so that endwise movement of the collar 40 will transmit its movement to the operating-rod 39 without effecting any longitudinal movement of the actuating-shaft 13.

The groove of the collar 40 has mounted therein the annular ring 43, said ring being mounted in the bifurcated lever 44, pivoted at 45 and by which an endwise movement is imparted to said collar for the purpose of moving the operating-rod 39. Either end of said rod 39 is provided with an adjustable member 46, the inner end of which bears upon a key 47, secured to the hub of the inner clutch member 30 and extending through slots 48 in the actuating-shaft 13 and through slots in the operating-rod 39. It is obvious by an inspection of the drawings that in the normal position the inner clutch members 30 are slightly removed from the inner face of the outer clutch members and at this time the adjustable member 46 at either end of the operating-rod is bearing against the key 47, secured to said inner clutch member, and it is evident that any movement of the operating-rod 39 in either direction will cause either one or the other of the inner clutch members 30 to be moved into position to cause a frictional contact between the clutch members 29 and 30 and cause a continuous revolution of the outer clutch members to be transmitted to the inner clutch members to produce a rotation of the actuating-shaft 13 in one direction or the other, the direction of rotation depending upon which pair of clutch members 20 21 is in coacting position, it being understood that the outer clutch members are continuously driven in opposite directions. This rotation thus accorded to the actuating-shaft 13 will operate the toggle members 38 to produce a frictional contact between the shoes 36 and the peripheral flange of the outer clutch members 29 to produce a rotation of the operating rod or member 39, as hereinbefore described. The operating-rod lever 44 has secured to its outer end a laterally-projecting rod 48*, on which is mounted a collar 49, interposed between springs 50, the tension of which is adjustable by means of nuts 51, threaded to said laterally-projecting rod 48*.

The collar 49 is articulated to the outer end of the bell-crank lever 52, to the opposite end of which is pivoted a nut 53, the threads of which are engaged by the threads upon one end of a connector 54, the opposite end of which is threaded to a nut 55, pivoted to the outer end of a lever 56, adjustably fulcrumed at 57 to a bracket 58. The lower end of the lever 56 is bifurcated, as at 59, the bifurcated end of which engages with the split collar 60, mounted in a grooved collar 61, movable endwise upon the driving-shafts 27, this endwise movement being caused by a pin 62, extending through slots in the shaft 27 of said collar 61 and passing through a slidable member 63, which member is located within a central bore of said driving-shaft 27 and has its outer end provided on two sides with a series of rack-teeth 64.

The teeth 64 of the slidable member 63 engage with a toothed segment 65, pivoted to the hub of the driving-pulley 28. At right angles to the slidable member 63 and meshing with each segment 65 is a slidable rack 66, the outer end of which is articulated to a centrifugal weight 67, pivoted at 68 to a boss upon the inner periphery of the pulley 28. The outer end of each weight 67 is provided with ears, between which is articulated a threaded shank passing through a bushing 70, secured to one end of a spring tension device 71, the opposite end of which is provided with a similar bushing 70, in which is threaded a corresponding threaded shank 69, which is articulated to the opposite weight 67 at a point 72 intermediate its fulcrum and its free end.

The shanks 69, threaded to the bushings 70 at either end of a spring 71, are threaded in opposite directions, so that by a turn of the tension device 71 this device will act as a turnbuckle and draw the two weights together or separate them as desired to vary the tension of the spring 71. In the normal position of the centrifugal mechanism, (shown in Fig. 6) the weights 67 are somewhat removed from the peripheral flange of the pulley 28, and it is obvious that any increase of speed of the pulley will cause the weights 67 to be moved outwardly by the centrifugal action thereon, and this movement will impart, through the racks 66 and segment 65, a sliding movement to the member 63, which movement will impart, through the pin 62, passing through the slots in the driving-shafts 27, a movement of the pivoted lever 56 to cause the operating member 39 to be moved lengthwise through the medium of the connector 54 and levers 52 and 44.

A decrease in speed of the pulley 28 will cause the weights to move toward the axis of the shaft 27 to move the various members mentioned in opposite direction to cause the operating member 39 to be moved toward the opposite end of the governor.

To the left end of the operating member 39 is secured a sprocket-wheel 73, as shown at the right of Fig. 4. This sprocket-wheel being geared to the member 39 transmits any rotary motion thereof through the sprocket-chain 74 to a sprocket-wheel 75, secured to a revoluble member 76, mounted in bearings 77 in the bifurcated standard 78, secured to the standard 11 at the left end of the machine.

The revoluble member 76 is free to turn within the bearings 77, but is incapable of endwise movement. It is provided with a threaded bore, which engages with the threaded end of the controlling-rod 79, this rod having secured thereon a roller 80, which engages with the revoluble disk 81, mounted upon a shaft having secured to its opposite end a gear 82, meshing with a gear 83, secured to one of the outer clutch members, said gears 82 83 producing a continuous revolution of the disk 81, the speed of revolution depending entirely upon the speed of the driving member 29, to which the gear 83 is secured or of which it forms a part.

It is obvious from the foregoing description that the rotation of the operating member 39 may be in either direction, according to which pair of clutch members are operating, and this rotation in either direction of the operating rod or member 39 is transmitted to the revoluble sleeve or member 76, threaded to the controlling-rod 79, and it is obvious that a revolution of said sleeve or member 76 in either direction will act upon said controlling-rod to cause the roller 80 to be moved out of its normal postion, as indicated in Fig. 2, diametrically across the disk 81, the length of movement in either direction depending entirely upon the amount of rotation accorded the operating member 39. The opposite end of the controlling-rod 79 is provided with a rack member 84, the teeth of which mesh with a spur-gear 85, secured to and revolving with the connector 54, and it is obvious that any endwise movement of the controlling-rod 79 will effect a rotary movement of said connector 54, the ends of which are threaded in opposite directions and engage with the nuts articulated to the outer ends of the levers 52 and 56. It is evident, therefore, that any increase or decrease of speed will be transmitted through the pulley 28 to the weights pivoted thereto, and the action of these weights will be transmitted through the various mechanisms described to the operating-rod 39, and then through the controlling-rod 79 the connector 54 will be rotated immediately in the nuts 53 and 55 to increase or decrease the distance between said nuts, as the case may be. As soon, however, as any changes in the relation of the various parts have been effected by the increase or decrease of speed of the motor, so that the roller 80 has been moved diametrically across the disk 81, the revolution of this disk will act upon the roller 80 to rotate it in one direction or the other, depending to which side of the center the roller has been moved. The effect of the rotation of said roller 80 and consequent rotation of the controlling-rod 79 would be to cause the threaded end of said controlling-rod to be rotated in the threaded sleeve 76 to thereby cause a return of the roller 80 to its normal position central to said revoluble disk 81. The return movement of the controlling-rod 79 effects, through the medium of the rack member 84 and gear 85, a rotation of the connector 54 to cause the threaded ends thereof coöperating with the nuts 53 and 55 to return the levers 56 and 44 to their normal positions.

The revoluble sleeve or member 76 is threaded, as at 86, and has mounted thereon a nut 87, which has an upwardly-projecting arm 88, provided with rack-teeth engaging with a segment 89, secured to a pointer 90, pivoted at 91 to a dial 92, said dial being graduated to indicate the position of the gate being controlled by the governor. This movement of the nut 81 endwise of the revoluble member 76 is produced by the revolution of said member 76, the threads thereon engaging with the threaded portion of said nut to cause an endwise movement thereof, the nut 81 being prevented from turning by means of a projection 93, through which a rod 94 passes.

The rod 94 is articulated at its opposite end to a lever 95, pivoted at 96 and connected at 97 to the operating-rod lever 44. The rod 94 is provided with a bearing in the bifurcated arm 77 and has adjustably secured thereto on either side of the projection 93 nuts 98, with which said projection 93 engages, to cause a movement of said rod in one direction or the other to effect a movement of the operating-rod 39, through the medium of the lever 44, to prevent injury to the various mechanisms, it being required that the nuts 98 should be sufficiently far away from the projection 93 to permit of the ordinary regulation of the speed of the motor without contact therewith; but should any unusual speed be transmitted to the mechanisms the projection 93 will act upon a nut 98 to effect a movement of the rod 39 to change the relations of the various mechanisms to prevent injury thereto. This movement of the lever 44 is effected without moving the lever 52, the springs 50 yielding to permit this.

As it may be desired at times to operate the regulating mechanism by hand, the shaft 12 may carry fast upon it a bevel-gear 99, meshing with a bevel-pinion 100, upon a spindle 101, turning in a support 102 and provided with a hand-wheel 103. When this hand mechanism is in use, the pin-clutch 17 may be drawn out of the disk 14 to disconnect the governor from the motor-controlling shaft.

The operation of the improved governor is as follows: With the parts in the relation here illustrated power is applied to the pulley 28 to drive it left-handedly at such a rate that normally for the desired speed of rotation of the machine the weights of the centrifugal mechanism contained within said pulley will be retained substantially at the center of their range of movement, and the various screws, racks, and the roller 80 will also be at the center of their path. This condition continues until there is a change in the speed of the motor—as, for example, an increase. This results in causing the weights forming part of the centrifugal mechanism to move outwardly under the increased centrifugal force generated, and the racks 66, secured thereto, will be moved thereby, and operating through the segment 65 the slidable member 64 will be permitted to move in the direction indicated by the arrows in Figs. 3 and 5. This movement of the slidable member will operate upon the pivoted lever 56 to move the lower end toward the front of the machine, while the upper end is moved in the opposite direction, thereby causing, through the bell-crank lever 52, the pivoted lever 44 to move the operating rod or member 39 in the direction indicated by the arrow in Fig. 4. This movement of the operating-rod 39 in a direction toward the left of Fig. 4 causes the clutch members 29 and 30 at the right of said figure to be set so that the actuating-shaft 13 and the operating member 39 will be rotated about their axes in unison with the clutch members 29 and 30 in the direction indicated by the arrow or toward the front of the machine. This rotation of the actuating member 13 will impart movement through the gears 15 and 16 to the motor-controlling shaft and cause a closing movement of the gate, if, for example, a hydraulic system is being governed, or a similar operation upon such motor as may be connected with the shaft 12 and the speed of which it is desired to regulate. The rotation of the operating member 39 will cause the revolution of the member 76. As the weights move outwardly to effect a movement of the clutch members through the medium of mechanisms already described the controlling-rod 79 is moved in a direction that will operate the connector 54 to increase the distance between the free ends of the levers 52 and 56, so that the lever 44 will operate more promptly than it would act otherwise, thus effecting an immediate partial correction of the governor, which is continued more gradually by the mechanism previously described until the desired movement is attained. The action of the connector 54 will cause the lever 44 to resume its normal position. If the weights acted alone upon the controlling mechanism, they would tend to cause too great a movement or to overcorrect. To obviate this difficulty and partially check the movement of the connector 54, the gear 85 on the latter is operated by the rack 84 and moved quickly at the beginning of its movement; but this movement is gradually decreased as the roller 80 moves diametrically across the disk 81 and away from its center. The action of the revoluble sleeve on the controlling-rod 79 is constant, while the rotation of the roller 80 is increased with its distance from the center of the disk 81. This gradually-decreasing effect of the rack 84 upon the gear 85 is due to the increase of speed of the roller 80 as it moves away from the center of the disk 81, which permits the threaded end of the controlling-rod 79 to more rapidly screw into the sleeve 76, and thereby more effectually offset the movement of said rod in the opposite direction effected by the action of said revoluble sleeve upon said threaded end. In other words, during the revolution of the member 76 the action of the threads on its bore is to effect a constant movement of the rod 79 toward the connector 54, while at the beginning of this movement the rotation of the roller 80 causes only a very slight turning of said threaded end of the rod 79 in the same direction; but as the roller moves farther from the center of the disk 81 and gradually increases in speed the threaded end will turn faster in a direction to practically offset the operation of the revoluble sleeve 76 thereon in the opposite direction. It is evident, therefore, that the initial action of the weights will cause the controlling mechanism to effect a quicker movement of the clutches and regulating mechanism than could be secured if the weights acted alone, and this action on the part of the controlling mechanisms gradually decreases, so that there is no opportunity for the various devices to overcorrect. When the speed decreases and the weights return to their normal operative position, the clutch members are released and the revolution of the operating member 39 and member 76 stops. The disk 81 continues to revolve, however, and act upon the roller 80, rotating it and causing the rod 79 to be screwed into the sleeve 76, and this movement of said rod will turn the connector 54 in its nuts 53 55 to decrease the distance between them and return the lever 56 to its normal position, when all of the mechanisms forming a part of the governor will be ready to care for any further increase or decrease in the speed of the motor.

It is obvious that in the operation of the various controlling mechanisms as described the roller 80 will remain at rest at the center of the disk 81, while the centrifugal weights occupy their normal position; but as soon as the controlling-rod carries the roller off the center to a point having rotary travel the roller and rod upon which it is mounted will be operated thereby in the sleeve 76 until it again reaches the axis of the revoluble disk 81.

It will be evident that the farther the weights depart from the normal the farther the roller 80 will be carried from the center of the disk and the more rapidly the shaft upon which said roller is mounted will be rotated, and therefore the neutralizing of the return of the weights will be at a rate varying with the extent of their movement and the distance which the rod has been moved, being at first most rapid, then gradually decreasing as the roller returns to the center. The neutralizing effect, will, moreover, be substantially proportional to the rate of return of the weights to the normal.

The action of this improved governor will be to secure a more rapid or greater correction for changes of speed of the motor governed arising from change of load or the like without permitting this correction to overrun and producing a seesawing of the speed in opposite directions, and in the present mechanism this is accomplished without any hydraulic mechanism or valves. All the various controlling and regulating mechanisms being mechanically connected and free from the fluctuation of the hydraulic pressure or other power, they are less liable at times to become inoperative and ineffective.

By the employment of mechanical connections throughout the operation of the governor it is absolutely positive in its operation. This governor mechanism, moreover, secures an almost absolutely constant rotation of the motor system driven thereby, while applying at all times ample power to overcome any resistance to movement of the gate or other regulating system.

It is believed that with the foregoing description the operation of this governor will be fully understood without further description.

Having thus described my invention, I claim—

1. In a governor, the combination of an actuating-shaft, a revoluble pulley, mechanism interposed between said pulley and said actuating-shaft for rotating the latter in opposite directions, two weights pivoted within said pulley, and a spring connecting the free ends of said weights.

2. In a governor, the combination of an actuating-shaft, a revoluble pulley, mechanism interposed between said pulley and said actuating-shaft for rotating the latter in opposite directions, two weights pivoted within said pulley, a spring connecting the free ends of said weights, a threaded bushing for either end of said spring, and a member pivoted to the free end of either weight and threaded to each bushing.

3. In a governor, the combination of an actuating-shaft, a revoluble pulley, mechanism interposed between said pulley and said actuating-shaft for rotating the latter in opposite directions, two weights pivoted within said pulley, a spring connecting the free ends of said weights, bushings interiorly threaded in opposite directions, one at either end of said spring, and a threaded member pivoted to the free end of each weight coacting with said bushing.

4. In a governor, the combination of an actuating-shaft, a revoluble pulley, mechanism interposed between said pulley and said actuating-shaft for rotating the latter in opposite directions, two weights pivoted within said pulley, a spring connecting the free ends of said weights, and means for adjusting the tension of said spring.

5. In a governor, the combination of an actuating-shaft, a revoluble pulley, mechanism interposed between said pulley and said actuating-shaft for rotating the latter in opposite directions, two weights pivoted within said pulley, and two springs interposed between said weights and each connecting the outer end of a weight to an intermediate part of the opposite weight.

6. In a governor, the combination of an actuating-shaft, a revoluble pulley, mechanism interposed between said pulley and said actuating-shaft for rotating the latter in opposite directions, two weights pivoted within said pulley, a spring interposed between and connecting the free ends of said weights, a rack connected to the free end of each weight, a slidable member provided with rack-teeth, a segment meshing with said slidable member and each rack, and means operable by said slidable member for controlling the application of power transmitted by said pulley.

7. In a governor, the combination of an actuating-shaft, a revoluble pulley, mechanism interposed between said pulley and said actuating-shaft for rotating the latter in opposite directions, two weights pivoted within said pulley, a spring connecting the free ends of said weights, a slidable member, means for producing a reciprocating movement of said slidable member by the movement of said weights about their pivots, and means operable by said slidable member for controlling the application of power transmitted by said pulley.

8. In a governor, the combination of an actuating-shaft, a revoluble driving-shaft therefor at right angles thereto, a pulley mounted on said driving-shaft, mechanism interposed between said driving-shaft and said actuating-shaft for rotating the latter in opposite directions, weights pivoted within said pulley, a slidable member located within said driving-shaft, mechanism for causing a reciprocation of said slidable member by the movement of said weights about their pivots, and means operable by said slidable member for controlling the application of power transmitted by said pulley.

9. In a governor, the combination of a revoluble pulley, two weights pivoted therein, a slidable member provided with rack-teeth, means actuated by said slidable member for controlling the operation of said governor, a slidable rack independently actuated by each weight, and a toothed member engaging with each rack and the teeth on said slidable member.

10. In a governor, the combination with a motor-controlling shaft, of an actuating-shaft therefor, two oppositely-rotating driving-shafts, a revoluble pulley, weights pivoted therein, pairs of coacting clutch members carried by the actuating-shaft and driving-shafts, means operated by said pivoted weights for moving one of said clutch members endwise into engagement with the other member, and mechanism operated by said clutch members for releasing them from engagement and returning the parts to their normal position.

11. In a governor, the combination with a motor-controlling shaft, of a hollow actuating-shaft therefor, two oppositely-rotating driving-shafts, a revoluble pulley, weights pivoted therein, pairs of coacting clutch members carried by the actuating-shaft and driving-shafts, an operating member located within said hollow actuating-shaft, means operated by said pivoted weights for moving said operating member endwise, a connector between said operating member and the clutch member mounted upon the actuating-shaft, and mechanism operated by said clutch members when in engagement for releasing them from engagement and returning the parts to their normal position.

12. In a governor, the combination with a motor-controlling shaft, of a hollow actuating-shaft therefor, two oppositely-rotating driving-shafts, a revoluble pulley, weights pivoted therein, pairs of coacting clutch members carried by the actuating-shaft and driving-shafts, an operating member located within said hollow actuating-shaft, means operated by said pivoted weights for moving said operating member, and means for adjusting the positions of said operating member and said actuating-shaft clutch member relative to each other.

13. In a governor, the combination with a motor-controlling shaft, of an actuating-shaft therefor, two oppositely-rotating driving-shafts, pairs of coacting clutch members carried by the actuating-shaft and driving-shafts, means for moving one of said clutch members endwise into engagement with the other member, and mechanism operated by said clutch members for releasing them from engagement and returning the parts to their normal positions.

14. In a governor, the combination with a motor-controlling shaft, of a hollow actuating-shaft therefor, two oppositely-rotating driving-shafts, pairs of coacting clutch members carried by the actuating-shaft and driving-shafts, an operating member located within said hollow actuating-shaft, means for moving said operating member endwise, a connector between said operating member and the clutch member mounted upon the actuating-shaft, and mechanism operated by said clutch members when in engagement for releasing them from engagement and returning the parts to their normal positions.

15. In a governor, the combination with a motor-controlling shaft, of a hollow actuating-shaft therefor, two oppositely-rotating driving-shafts, pairs of coacting clutch members carried by the actuating-shaft and driving-shafts, an operating member located within said hollow actuating-shaft, and means for adjusting the positions of said operating member and said actuating-shaft clutch member relative to each other.

16. In a governor, the combination with a motor-controlling shaft, of a hollow actuating-shaft therefor, two oppositely-rotating driving-shafts, pairs of coacting clutch members carried by the actuating-shaft and driving-shafts, an operating member located within said actuating-shaft and provided with an adjustable shoulder, a member secured to the actuating-shaft clutch member and coöperating with said shoulder, and mechanism operated by said clutch members when in engagement for releasing them from engagement and returning the parts to their normal positions.

17. In a governor, the combination with a motor-controlling shaft, of a hollow actuating-shaft therefor, two oppositely-rotating driving-shafts, pairs of coacting clutch members carried by the actuating-shaft and driving-shafts, a revoluble operating member located within said actuating-shaft, a sprocket-wheel mounted on the outer end of said operating member and revoluble therewith, and mechanism actuated by said sprocket-wheel when the clutch members are in engagement for releasing them from engagement and returning the parts to their normal positions.

18. In a governor, the combination with a motor-controlling shaft, of a hollow actuating-shaft therefor, two oppositely-rotating driving-shafts, pairs of coacting clutch members carried by the actuating-shaft and driving-shafts, means for moving the actuating-shaft endwise to move its clutch member into engagement with a driving-shaft clutch member, shoes coöperating with the inner periphery of the driving-shaft clutch members, an operating member within said hollow actuating-shaft, and means interposed between said shoes and said operating member to bring said shoes into engagement with the inner periphery of said driving-shaft clutch members when said members begin to revolve.

19. In a governor, the combination with a motor-controlling shaft, of a hollow actuating-shaft therefor, two oppositely-rotating driving-shafts, pairs of coacting clutch members carried by the actuating-shaft and driving shafts, means for moving the actuating-shaft endwise to move its clutch member into engagement with a driving-shaft clutch member, shoes coöperating with the inner periphery of the driving-shaft clutch members, an operating member within said hollow actuating-shaft, means interposed between said shoes and said operating member to bring said shoes into engagement with the inner periphery of said driving-shaft clutch members when said members begin to revolve, and mechanism actuated by said operating member for releasing the clutch members from engagement and returning the parts to their normal positions.

20. In a governor, the combination with a motor-controlling shaft, of a hollow actuating-shaft therefor, two oppositely-rotating driving-shafts, pairs of coacting clutch members carried by the actuating-shaft and driving-shafts, means for moving the actuating-shaft endwise to move its clutch member into engagement with a driving-shaft clutch member, shoes coöperating with the inner periphery of the driving-shaft clutch members, an operating member within said hollow actuating-shaft, a connector between each of said shoes and said operating member, and mechanism actuated by said operating member for releasing the clutch members from engagement and returning the parts to their normal positions.

21. In a governor, the combination with a motor-controlling shaft, of a hollow actuating-shaft therefor, two oppositely-rotating driving-shafts, pairs of coacting clutch members carried by the actuating-shaft and driving-shafts, means for moving the actuating-shaft endwise to move its clutch member into engagement with a driving-shaft clutch member, shoes coöperating with the inner periphery of the driving-shaft clutch members, an operating member within said hollow actuating-shaft, an adjustable connector between each of said shoes and said operating member, and mechanism actuated by said operating member for releasing the clutch members from engagement and returning the parts to their normal positions.

22. In a governor, the combination with a motor-controlling shaft, of a hollow actuating-shaft therefor, two oppositely-rotating driving-shafts, pairs of coacting clutch members carried by the actuating-shaft and driving-shafts, means for moving the actuating-shaft endwise to move its clutch member into engagement with a driving-shaft clutch member, shoes coöperating with the inner periphery of the driving-shaft clutch members, an operating member within said hollow actuating-shaft, supports for said shoes, radial arms secured to said hollow actuating-shaft, links connecting the ends of said arms with said shoes, and a connector between each of said shoes and said operating member.

23. In a governor, the combination with a motor-controlling shaft, of an actuating-shaft therefor, two oppositely-rotating driving-shafts, pairs of coacting clutch members carried by the actuating-shaft and driving-shafts, an operating member for moving one of said members endwise into engagement with the other member and revoluble when said clutch members are in engagement, a sprocket-wheel revoluble with said operating member, an internally-threaded member revoluble by said sprocket-wheel, a controlling-rod threaded into said revoluble member, a roll mounted on said rod, a disk revoluble with one of the driving-shafts, and mechanism actuated by said controlling-rod for controlling the application of power.

24. In a governor, the combination with a motor-controlling shaft, of an actuating-shaft therefor, two oppositely-rotating driving-shafts, pairs of coacting clutch members carried by the actuating-shaft and driving-shafts, an operating member for moving one of said clutch members into engagement with the other member and revoluble when said clutch members are in engagement, an indicator, mechanism for controlling the application of power, and means actuated by said operating member for operating simultaneously said controlling mechanism and said indicator.

25. In a governor, the combination with a motor-controlling shaft, of an actuating-shaft therefor, two oppositely-rotating driving-shafts, pairs of coacting clutch members carried by the actuating-shaft and driving-shafts, an operating member for moving one of said clutch members into engagement with the other member and revoluble when said clutch members are in engagement, an indicator, mechanism for controlling the application of power, means actuated by said operating member for operating simultaneously said controlling mechanism and said indicator, and means for returning said mechanisms to their normal positions as the speed of the governor returns to its normal.

26. In a governor, the combination with a motor-controlling shaft, of an actuating-shaft therefor, two oppositely-rotating driving-shafts, pairs of coacting clutch members carried by the actuating-shaft and driving-shafts, an operating member for moving one of said clutch members into engagement with the other member and revoluble when said clutch members are in engagement, an indicator, a revoluble member, means for operating said indicator by the revolution of said member, and means actuated by said operating member for revolving said revoluble member.

27. In a governor, the combination with a motor-controlling shaft, of an actuating-shaft therefor, two oppositely-rotating driving-shafts, pairs of coacting clutch members carried by the actuating-shaft and driving-shafts, an operating member for moving one of said clutch members into engagement with the other member and revoluble when said clutch members are in engagement, an indicator-dial, a pointer therefor, a segment for operating said pointer, a rack member engaging said segment, a revoluble member, means for operating said rack member by the revolution thereof, and means interposed between said operating member and said revoluble member for driving the latter by the revolution of the former.

28. In a governor, the combination with a motor-controlling shaft, of an actuating-shaft therefor, two oppositely-rotating driving-shafts, pairs of coacting clutch members carried by the actuating-shaft and driving-shafts, an operating member for moving one of said clutch members into engagement with the other member and revoluble when said clutch members are in engagement, an indicator-dial, a pointer therefor, a segment for operating said pointer, a rack member provided with a nut portion, a revoluble member threaded into said nut portion, means for operating said rack member by the revolution thereof, and means interposed between said operating member and said revoluble member for driving the latter by the revolution of the former.

29. In a governor, the combination with a motor-controlling shaft, of an actuating-shaft therefor, two oppositely-rotating driving-shafts, pairs of coacting clutch members carried by the actuating-shaft and driving-shafts, an operating member for moving one of said clutch members into engagement with the other member and revoluble when said clutch members are in engagement, an indicator-dial, a pointer therefor, a segment for operating said pointer, a rack member provided with a nut portion, a revoluble member provided with an interiorly-threaded chamber, a controlling-rod engaging the threads thereof, and means for returning said controlling-rod and said pointer to their normal when the speed of the governor is returned to its normal.

30. In a governor, the combination of a motor-controlling shaft, an actuating-shaft therefor, two oppositely-rotating driving-shafts, pairs of coacting clutch members carried by the actuating-shaft and driving-shafts, mechanism controlling the application of power including in part a revoluble disk, and means for revolving said disk from one of the driving-shafts.

31. In a governor, the combination of a motor-controlling shaft, an actuating-shaft therefor, two oppositely-rotating driving-shafts, pairs of coacting clutch members carried by the actuating-shaft and driving-shafts, mechanism controlling the application of power including in part a revoluble disk, a gear revolving with said disk, and a gear secured to a driving-shaft and meshing therewith.

32. In a governor, the combination of a motor-controlling shaft, a hollow actuating-shaft therefor, two oppositely-rotating driving-shafts, pairs of coacting clutch members carried by the actuating-shaft and driving-shafts, an operating member for the clutches movable within the actuating-shaft, a shaft at right angles to said driving-shafts for operating the latter, a pulley therefor, and mechanism for controlling the application of power located in part within said pulley.

33. In a governor, the combination with mechanism for controlling the application of power, of an operating member, a revoluble member, a nut thereon movable lengthwise thereof by the revolution of said revoluble member, and means operated by said nut at the extreme of its movement for moving the operating member in a reverse direction.

34. In a governor, the combination with mechanism for controlling the application of power, of an operating member, a revoluble member, a nut thereon movable lengthwise thereof by the revolution of said revoluble member, a lever for actuating said operating member, and means interposed between said lever and said nut for actuating said operating member when said nut reaches the extreme of its movement in either direction.

35. In a governor, the combination with mechanism for controlling the application of power, of an operating member, a lever for actuating the same, a revoluble member, a nut thereon movable lengthwise thereof by the revolution of said revoluble member, a rod connected to said actuating-lever, and shoulders on the opposite end of said rod on either side of said nut and in the path of movement thereof.

36. In a governor, the combination with mechanism for controlling the application of power, of an operating member, a lever for actuating the same, a revoluble member, a nut thereon movable lengthwise thereof by the revolution of said revoluble member, a rod connected to said actuating-lever, and nuts adjustable on the opposite end of said rod on either side of said nut and in the path of movement thereof.

37. In a governor, the combination with an actuating-shaft, of two oppositely-rotating driving-shafts, pairs of coacting clutch members, one member of each pair being secured to the actuating-shaft and the other to a driving-shaft, and a lever interposed between said driving-shafts and adapted to move said actuating-shaft lengthwise.

38. In a governor, the combination with a hollow actuating-shaft, of two oppositely-rotating driving-shafts, an operating member within said actuating-shaft, and a lever interposed between said driving-shafts and adapted to move said operating member lengthwise.

39. In a governor, the combination with a hollow actuating-shaft, of two oppositely-rotating driving-shafts, pairs of coacting clutch members, one member of each pair being secured to the actuating-shaft and the other to a driving-shaft, a key secured to the actuating-shaft clutch member, an operating member movable within said actuating-shaft, and an adjustable shoulder adapted to coöperate with said key.

40. In a governor, the combination with a hollow actuating-shaft provided with a transverse slot, of two oppositely-rotating driving-shafts, an operating member within said actuating-shaft, a collar upon said actuating-shaft, a pin extending from said collar through the slot in the actuating-shaft and into the operating member, and a forked lever coöperating with said collar for moving said operating member lengthwise.

41. In a governor, the combination with a hollow actuating-shaft, of two oppositely-rotating driving-shafts, an operating member within said actuating-shaft, a grooved collar upon said actuating-shaft, a ring mounted in said groove, a forked lever engaging with said ring for moving said operating member lengthwise, and a pin extending from said collar through a slot in the actuating-shaft and into the operating member.

42. In a governor, the combination with a hollow actuating-shaft, of two oppositely-rotating driving-shafts, pairs of coacting clutch members carried by the actuating-shaft and driving-shafts, an operating member movable within the actuating-shaft, a revoluble disk, a controlling-rod movable lengthwise by said operating member, a roller on said rod coöperating with said revoluble disk, a rack secured to the opposite end of said rod, a lever for actuating said operating member, and mechanism interposed between said lever and driving mechanism and operated by said rack to return the parts to their normal positions.

43. In a governor, the combination with a hollow actuating-shaft, of means for rotating the actuating-shaft in opposite directions, connectors between the rotating means and said actuating-shaft, and an operating member movable lengthwise of said actuating-shaft and rotatable therein.

44. In a governor, the combination with a hollow actuating-shaft, of means for rotating the actuating-shaft in opposite directions, connectors between the rotating means and said actuating-shaft, an operating member, power mechanism acting thereon to produce a partial rotation thereof, and means for controlling the application of power actuated by the rotation thus produced.

45. In a governor, the combination with a hollow actuating-shaft, of two oppositely-rotating driving-shafts, pairs of coacting clutch members carried by the actuating-shaft and driving-shafts, an operating member movable within the actuating-shaft, a driving-pulley, centrifugal mechanism located within said pulley, a slidable member operated thereby, a lever for actuating said operating member by the movement of said slidable member, and mechanism actuated by the movement of said operating member to cause the return of the various mechanisms to their normal positions.

46. In a governor, the combination with a hollow actuating-shaft, of two oppositely-rotating driving-shafts, pairs of coacting clutch members carried by the actuating-shaft and driving-shafts, an operating member movable within the actuating-shaft, a driving-pulley, centrifugal mechanism located within said pulley, a slidable member operated thereby, a pivoted lever actuated by said slidable member, a second lever for producing an endwise movement of said operating member, a connector between said levers, and mechanism actuated by the movement of said operating member to return the various mechanisms to their normal positions.

47. In a governor, the combination with a hollow actuating-shaft, of two oppositely-rotating driving-shafts, pairs of coacting clutch members carried by the actuating-shaft and driving-shafts, an operating member movable within the actuating-shaft, a driving-pulley, a centrifugal mechanism located within said pulley, a slidable member operated thereby, a pivoted lever actuated by said slidable member, a second lever for producing an endwise movement of said operating member, a threaded nut fulcrumed in the outer end of each lever, a right and left hand threaded connector engaging with said nuts, and mechanism actuated by the movement of said operating member to return the various mechanisms to their normal positions.

48. In a governor, the combination with a hollow actuating-shaft, of two oppositely-rotating driving-shafts, pairs of coacting clutch members carried by the actuating-shaft, a driving-pulley, centrifugal mechanism located within said pulley, a slidable member operated thereby, a pivoted lever actuated by said slidable member, a second lever for producing an endwise movement of said operating member, a threaded nut fulcrumed in the outer end of each lever, a right and left hand threaded connector engaging with said nuts, a gear mounted on said connector, a rack meshing with said gear, a controlling-rod producing an endwise movement to said rack, a roller thereon, a revoluble disk coöperating with said roller which is normally centered thereon, mechanism actuated by the movement of the operating-rod for moving said roller transversely of said disk, and mechanism to cause the return of the roller to its normal position by its rotation by said revoluble disk.

49. In a governor, the combination with a hollow actuating-shaft, of two oppositely-rotating driving-shafts, pairs of coacting clutch members carried by the actuating-shaft and driving-shafts, an operating member movable within the actuating-shaft, a driving-pulley, centrifugal mechanism located within said pulley, a slidable member operated thereby, a lever for actuating said operating member by the movement of said slidable member, a rod projecting laterally from the free end of said lever, a collar thereon, a bell-crank lever for actuating said collar, adjustable shoulders on said rod on either side of said collar, springs interposed between said collar and shoulders, a threaded nut in the free end of said bell-crank lever, a lever actuated by said slidable member, a nut in the free end thereof, a right and left hand thread connector between said nuts, and mechanism actuated by the movement of said operating member to return the various mechanisms to their normal positions.

50. In a governor, the combination with a hollow actuating-shaft, of two oppositely-rotating driving-shafts, pairs of coacting clutch members carried by the actuating-shaft and driving-shafts, an operating member movable within the actuating-shaft, a driving-pulley, centrifugal mechanism located within said pulley, a slidable member operated thereby, a lever operated by said slidable member, a nut in the free end thereof, a lever for actuating said operating member, a rod projecting laterally from the free end of said lever, a collar thereon, a bell-crank lever for actuating said collar, adjustable shoulders on said rod on either side of said collar, springs interposed between said collar and shoulders, a threaded nut in the free end of said bell-crank lever, a right and left hand threaded connector between said nuts, a controlling-rod, a roller thereon, a revoluble disk coöperating therewith, a revoluble nut adapted to engage the threaded end of said controlling-rod, and means for revolving said nut by the revolution of said operating member.

51. In a governor, the combination with a hollow actuating-shaft, of means for rotating the actuating-shaft in opposite directions, connectors between the rotating means and actuating-shaft, an operating member therefor movable with said actuating-shaft, power mechanism acting upon the operating member to cause the rotation of the actuating-shaft in one direction or the other, means for producing a rotation of said operating member, and mechanism controlled by the rotation of said operating member for counteracting the effect of the power mechanism upon said operating member.

52. In a governor, the combination with a hollow actuating-shaft, of two oppositely-rotating driving-shafts surrounding the actuating-shaft, an outer clutch member fast upon each driving-shaft, coacting inner clutch members fast upon the actuating-shaft, a rod within the actuating-shaft connected with the inner clutch members, a forked lever connected to said rod midway its ends, and means for applying power to the free end of said lever.

53. In a governor, the combination with a hollow actuating-shaft, of two oppositely-rotating driving-shafts surrounding the actuating-shaft, an outer clutch member fast upon each driving-shaft, coacting inner clutch members fast upon the actuating-shaft, a rod within the actuating-shaft connected with the inner clutch members, a forked lever connected to said rod midway its ends, means for applying power to the free end of said lever, and means for rotating said rod when the clutch members are in engagement.

54. In a governor, the combination with a hollow actuating-shaft, of two oppositely-rotating driving-shafts, pairs of coacting clutch members, one member of each pair being secured to the actuating-shaft and the other member to a driving-shaft, an operating member movable within said actuating-shaft, power mechanism acting to effect the engagement of the clutches, and means for disengaging the clutches operable by the rotation of said operating member.

55. In a governor, the combination with a hollow actuating-shaft, of means for rotating the actuating-shaft in opposite directions, connectors between the rotating means and actuating-shaft, an operating member therefor, power mechanism acting upon said operating member to cause the rotation of the actuating mechanism in one direction or the other, and means operable from the operating member for counteracting the effect of the power mechanism upon said operating member.

Signed by me at Boston, Massachusetts, this 2d day of May, 1904.

NATHANIEL LOMBARD.

Witnesses:
WALTER E. LOMBARD,
EDNA C. CLEVELAND.